Figure 1:
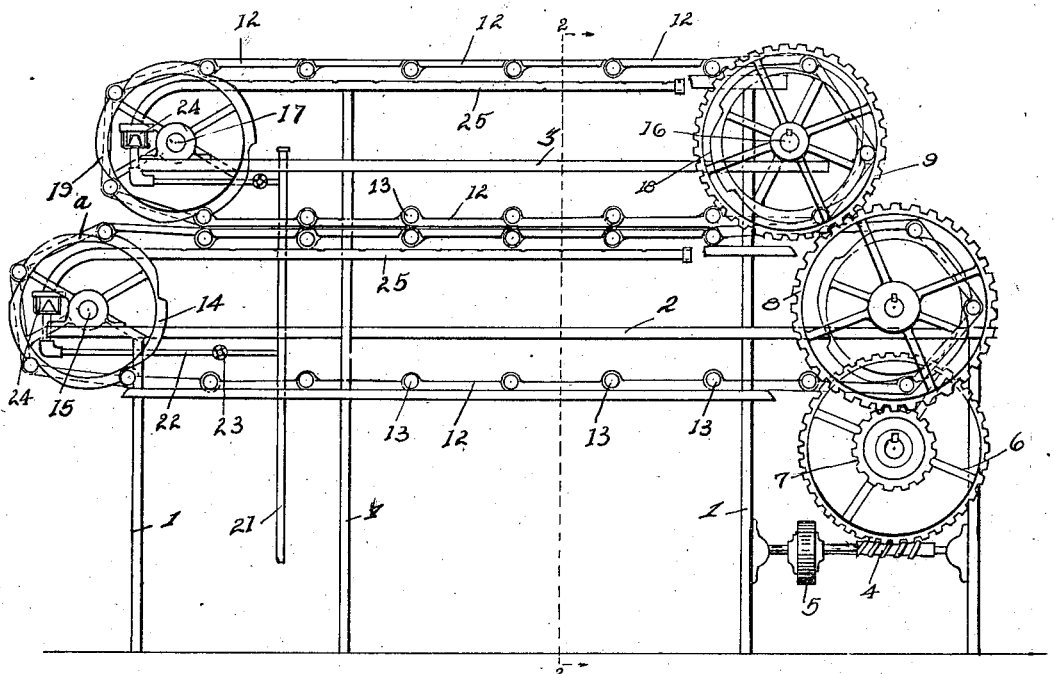

J. H. CARPENTER & E. O. HOFFMAN.
BAKING MACHINE.
APPLICATION FILED FEB. 20, 1911.

1,014,375.

Patented Jan. 9, 1912.

2 SHEETS—SHEET 1.

J. H. CARPENTER & E. O. HOFFMAN.
BAKING MACHINE.
APPLICATION FILED FEB. 20, 1911.

1,014,375.

Patented Jan. 9, 1912.

2 SHEETS—SHEET 2.

Witnesses
Dennis Dalton
A. L. Phelps

Inventor
John H. Carpenter
Edgar O. Hoffman
By C. C. Shepherd Attorney

UNITED STATES PATENT OFFICE.

JOHN H. CARPENTER AND EDGAR O. HOFFMAN, OF COLUMBUS, OHIO; SAID HOFFMAN ASSIGNOR TO SAID CARPENTER.

BAKING-MACHINE.

1,014,375. Specification of Letters Patent. Patented Jan. 9, 1912.

Application filed February 20, 1911. Serial No. 609,807.

*To all whom it may concern:*

Be it known that we, JOHN H. CARPENTER and EDGAR O. HOFFMAN, citizens of the United States, residing at Columbus, in the county of Franklin and State of Ohio, have invented certain new and useful Improvements in Baking-Machines, of which the following is a specification.

This invention relates to certain novel and useful improvements in baking machines, and has particular application to a mechanism of the class referred to designed especially for baking cake-like products, such for instance as are used for forming ice cream cones.

In carrying out our invention, it is our purpose to provide a machine embodying in its construction the desired features of simplicity, durability and strength; to provide a machine whereby the cakes may be rapidly and thoroughly baked, the construction and arrangement being such that the cake is completely baked during the traverse of the baking irons from one end of the frame to the other.

Our invention aims to provide a structure of baking machine desirably comprising superposed chain-like elements of a complemental nature which are desirably in endless form and which are preferably geared together and operated from the same mechanism. In the production of a machine of this type, it is necessary that there be provided such a structural formation that will permit of the application of the batter to the machine and desirably to the lower chain just preceding the entry of the coöperating chains into complemental relation. This is essential because it is of the highest importance that the batter, such as the batter for a cone wafer, be baked equally upon both sides and therefore any prolonged exposure of the batter to the atmosphere will cause a baking of the wafer more upon the side resting upon the lower baking plate. It is equally necessary that there be provided a surface upon the lower chain for rolling the wafer as it is delivered in baked form. Our invention therefore contemplates, not only the provision of a baking machine of chain form, but it aims to produce a baking machine for ice cream cones of chain form, which will present each baking plate in a substantially horizontal position just preceding its entry into coactive relation with its complemental baking plate and which will likewise present each baking plate in a substantially horizontal position just succeeding the delivery of the baked wafer from between the complemental chains, such delivery being for the purpose of rolling the wafer into the form of a cone as will be well understood.

In the production of a chain type of machine for baking ice cream cone wafers, we find it extremely desirable to provide a means for preventing separation of the chains during complemental action and such means desirably takes the form of a guide coacting with elements carried by the lower chain for maintaining such lower chain in proper relation to the upper chain. It is also desirable to form the chains entirely of the baking plates with the exception of such joining mechanism as may be necessary and with the exception of a suitable means for coaction with the said guide wheels for coaction with sprocket wheels for driving the chains.

It is also our purpose to provide a machine embodying in its construction, a plurality of baking irons in the form of endless chains, the irons coöperating to form means for baking the cakes, as they pass over the heating device of the machine.

With the above recited objects and others of a similar nature in view, our invention consists in the construction, combination and arrangement of parts set forth in and falling within scope of the appended claims.

Figure 2:
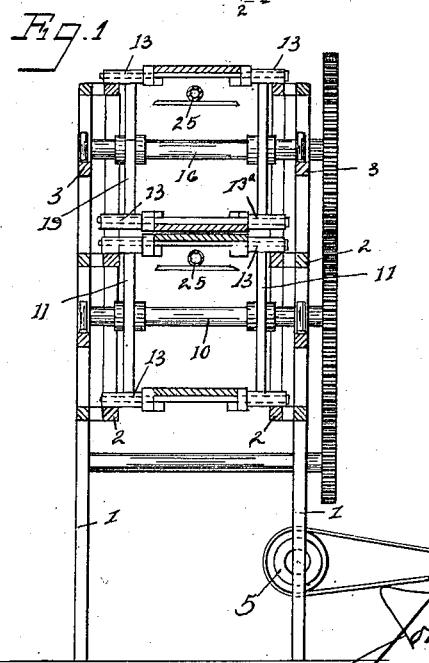
Figure 3:
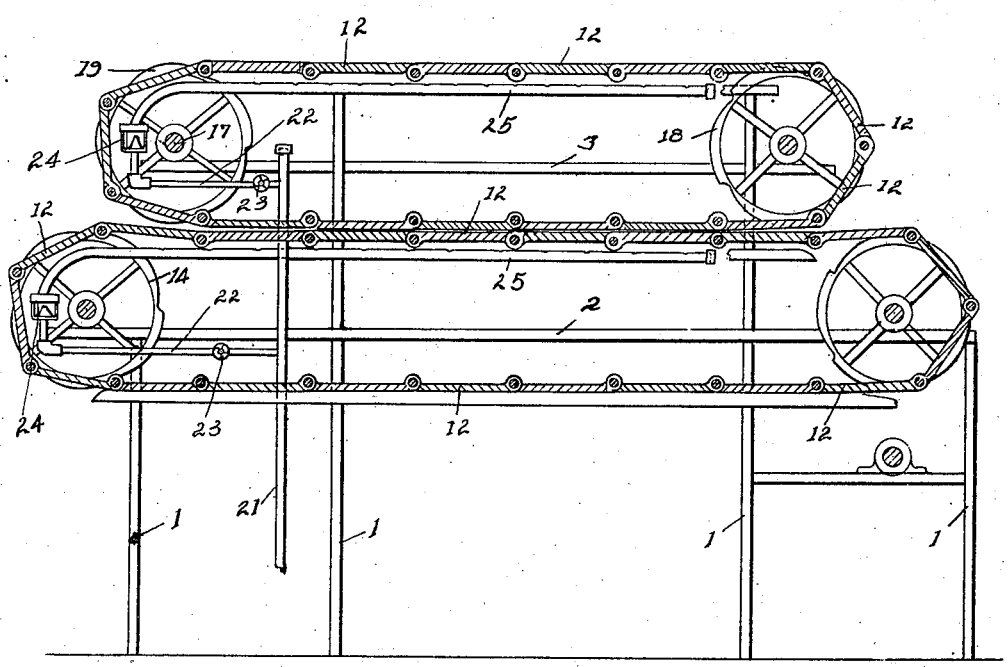
Figure 4:
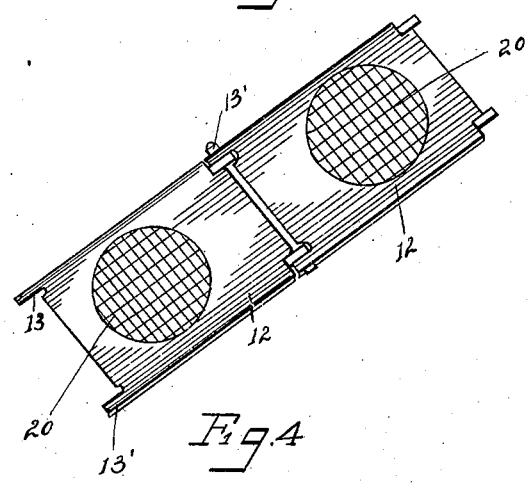

In the accompanying drawings—Figure 1 is a view in side elevation of a machine embodying our invention, Fig. 2 is a transverse vertical sectional view taken on the line 2—2 of Fig. 1 looking in the direction of the arrows, Fig. 3 is a longitudinal vertical sectional view taken through the machine shown in Fig. 1, and Fig. 4 is a view showing the baking irons or plates, and the manner of hinging or linking the same.

Referring now to the accompanying drawings in detail, the letter A designates the frame as an entirety, said frame being composed of a number of vertical standards 1 and the horizontally disposed longitudinally extending struts 2 over which the baking irons are adapted to travel, said frame also having additional pairs of longitudinal struts 3, for supporting the journal boxes or bearings of the shafts of the drive wheels or gears.

The numeral 4 indicates a worm shaft provided with a suitable driving pulley 5, the worm intermeshing with the lower gear wheel 6, the latter in turn being provided with a pinion 7 meshing with the intermediate drive gear 8 which in turn meshes with the top drive gear 9, the intermediate gear driving the lower center baking irons, while the upper gear imparts motion to the upper shaft, as will be hereinafter described. The shaft of the intermediate gear is shown at 10 and carries the pair of sprockets 11, over which pass the baking plates 12, the latter being in the form of an endless chain, each plate 12 being linked or connected to the adjacent plate as at 13, said endless chain of plates passing over sprockets 14 mounted upon the shaft 15, arranged at the opposite end of the frame from that carrying the driving mechanism. Similarly the shafts 16 and 17 of the upper series of endless plates are provided with pairs of sprockets 18 and 19 respectively over which travel the endless chain of baking plates forming the upper section, said plates which are similar to those of the lower section being hinged or linked in the same manner, and as the construction of the two endless chains is the same, we have used the same reference numeral 12 for designating the plates and 13 for indicating the link or connection therefor.

The construction of the plates is more clearly shown in perspective in Fig. 4, such view illustrating the construction of sections of the batter receiving plates or irons, each iron comprising a plate-like member 12 having perforated lugs or extensions 13′ for receiving the bolt or pivot 13 which fastens the lug to the adjacent lug of the next section. The face of this plate is also scored or roughened as at 20 to produce any suitable design.

The baking irons may be heated in any preferred or desired manner, and in the drawings we have shown one way of accomplishing this.

The reference numeral 21 designates a gas supply main extending vertically through the frame and from which extends the branch pipes 22 controlled by the valves 23, said pipes leading to the mixing chambers 24, where the gas is mixed with the air, the perforated heating pipes 25 leading from said mixing chamber longitudinally of the frame and directly beneath the baking plates, so that the latter will be heated to properly bake the batter. The bolts 13 connecting the plates and maintaining the same in chain form through the medium of the pierced lugs 13′ are extended laterally and provided with rollers 13ª with which the sprockets 14 coact for driving the chains. In addition, the rollers 13ª of the lower chain element ride upon the guide struts 2, previously mentioned, and support the lower chain in positive and determinate relation to the lower side of the upper chain.

From the above description, taken in connection with the accompanying drawings, the construction of our improved baking machine, and the manner of employing the same, will be readily apparent to those skilled in the art. The batter is deposited upon the plates of the lower chain of baking irons, for instance at the point $a$, or just where the plate, which travels from the left toward the right, starts to turn over the top of the sprockets, and said batter is then carried along in the travel of the plate. Meantime the series of upper baking irons or plates, is geared to travel toward the right, so that as the plates go under the sprockets, they aline with and lie above the lower plates or those carrying the batter, thereby forming in conjunction with the lower plates, a two-part baking iron comprising the upper plate and the lower plate and between which the cake lies, and is baked as the sections pass over the perforated heating pipe. It will further be seen that the upper plates are also heated through the medium of the top pipe 21, so that the heat is constantly applied to the top or cover irons during their rotation or travel.

It will be seen that we have provided an exceedingly simple yet efficient form of machine, whereby the cakes may be rapidly and thoroughly baked with a comparatively little expenditure of time and labor.

While we have herein shown and described one particular embodiment of our invention, we wish it to be understood that we do not confine ourselves to all the precise details of construction set forth herein, as modification and variation may be made without departing from the spirit of the invention or exceeding the scope of the appended claims.

We wish it to be further understood that we do not limit ourselves to the precise construction of frame, or to the form and size of the baking plates, or any particular number of the latter, as the endless chain of plates may be of any length, and the sprockets shifted along the frame accordingly to accommodate any chain of plates or irons which may be used.

What we claim, is--

1. A baking machine comprising a lower element in the form of a traveling chain of baking plates, an upper coactive element in the form of a traveling chain of complemental baking plates, said upper element being terminated short of said lower element at the delivery end, and heating means.

2. A baking machine comprising a lower element in the form of a traveling chain of baking plates, an upper coactive element in the form of a traveling chain of complemental baking plates, said upper element being terminated short of said lower element at the delivery end, and an external heating means for heating said plates during travel.

3. A baking machine comprising a lower element in the form of a traveling chain of baking plates, an upper element in the form of a traveling chain of complemental baking plates terminated short of said lower element at the delivery end, and means for maintaining the plates of said lower element against sagging away from the plates of said upper element.

4. A baking machine comprising a lower element in the form of a traveling chain of baking plates, an upper element in the form of a traveling chain of complemental baking plates terminated short of said lower element at the delivery end, and a guide for maintaining the plates of said lower element against sagging away from the plates of said upper element.

5. A baking machine comprising a lower element in the form of a traveling chain of baking plates, an upper element in the form of a traveling chain of complemental baking plates terminated short of said lower element at the delivery end, a guide for maintaining the plates of said lower element against sagging away from the plates of said upper element, and rollers on said chain of plates for running on said guide to effect such maintenance.

6. A baking machine comprising a lower element in the form of a traveling chain of baking plates, an upper element in the form of a traveling chain of complemental baking plates terminated short of said lower element at the delivery end, a guide for maintaining the plates of said lower element against sagging away from the plates of said upper element, sprockets for driving said chain, and laterally extending elements on said chains of plates for coaction with said sprockets.

7. A baking machine comprising a lower element in the form of a traveling chain of baking plates, an upper element in the form of a traveling chain of complemental baking plates, hinged structure between said plates of a nature to preclude any material separation of the adjacent ends of said plates in any angle they may assume, laterally extending elements on said hinged structure, and sprockets constructed to coöperate with said lateral elements for driving said chains.

8. A baking machine comprising a lower element in the form of a traveling chain of baking plates, an upper element in the form of a traveling chain of complemental baking plates, hinged structure between said plates of a nature to preclude material separation of the adjacent ends of said plates in any angle they may assume, laterally extending elements on said hinged structure, a guide coöperative with said elements on one of said chains for maintaining the said chains in proper relative position during operation, and sprockets constructed to coöperate with said elements for driving said chains.

9. A baking machine comprising a plurality of baking plates having interfitting hinge-loops upon adjacent ends, a bolt connecting each pair of adjacent ends of said plates through the medium of the said hinge-loops, lateral extensions on said bolts, and sprocket wheels constructed to drive the chain of plates formed through coaction with said lateral extensions.

10. A baking machine comprising a lower element, an upper complemental element, a chain of complemental plates forming the essential feature of each of said elements, the chain of plates forming the main feature of said lower element being of sufficient length in comparison with said upper element to present each of its plates in substantially horizontal and accessible position before entrance into and after passage from coöperative relation with the chain of plates of said upper element.

In testimony whereof we affix our signatures in presence of two witnesses.

JOHN H. CARPENTER.
EDGAR O. HOFFMAN.

Witnesses:
A. L. PHELPS,
INGLE A. MORRIS.